(12) United States Patent
Derks et al.

(10) Patent No.: US 7,599,703 B2
(45) Date of Patent: Oct. 6, 2009

(54) WIRELESS POLLING SYSTEM USING SPREAD-SPECTRUM COMMUNICATION

(75) Inventors: Harry G. Derks, Holland, MI (US);
Michael S. Glass, Conklin, MI (US);
Michael B. Hall, Holland, MI (US);
Troy A. Redder, Grand Haven, MI (US);
David L. Ramon, Holland, MI (US)

(73) Assignee: Fleetwood Group, Inc., Holland, MI (US)

( * ) Notice: Subject to any disclaimer, the term of this patent is extended or adjusted under 35 U.S.C. 154(b) by 671 days.

(21) Appl. No.: 10/709,527

(22) Filed: May 12, 2004

(65) Prior Publication Data
US 2004/0229642 A1    Nov. 18, 2004

Related U.S. Application Data

(60) Provisional application No. 60/469,697, filed on May 12, 2003.

(51) Int. Cl.
*H04B 7/00* (2006.01)
(52) U.S. Cl. .................. 455/518; 455/519; 375/132
(58) Field of Classification Search ............... 455/41.2, 455/416, 517–519, 2.01; 370/259, 260; 375/130, 375/132
See application file for complete search history.

(56) References Cited

U.S. PATENT DOCUMENTS

| | | | |
|---|---|---|---|
| 4,850,036 A | 7/1989 | Smith | 455/179 |
| RE35,449 E | 2/1997 | Derks | 395/800 |
| 5,724,357 A | 3/1998 | Derks | 370/413 |
| 6,021,119 A | 2/2000 | Derks et al. | 370/261 |
| 6,654,588 B2 * | 11/2003 | Moskowitz et al. | 434/350 |
| 6,665,000 B1 | 12/2003 | Buehler et al. | 348/14.08 |

(Continued)

FOREIGN PATENT DOCUMENTS

GB    2 101 847 A    6/1982

(Continued)

OTHER PUBLICATIONS

European Search Report dated Sep. 6, 2004 from corresponding EPC Application No. 04394027.9-1525-, filed May 12, 2004.

(Continued)

*Primary Examiner*—Raymond S Dean
(74) *Attorney, Agent, or Firm*—Van Dyke, Gardner, Linn & Burkhart, LLP

(57) ABSTRACT

A wireless communication system and method includes providing at least one master unit and a plurality of slave units communicating with the at least one master unit over at least one wireless communication link. The at least one master unit sends polling signals to the slave units over the at least one wireless communication link. The slave units send data to the at least one master unit over the at least one communication link in response to one of the polling signals. The communication link is made up of at least one master transceiver at the at least one master unit and a plurality of slave transceivers each at one of the slave units. The at least one master transceiver and the slave transceivers communicate with a spread-spectrum hopping protocol.

42 Claims, 9 Drawing Sheets

U.S. PATENT DOCUMENTS

2003/0060222 A1 * 3/2003 Rune .......................... 455/517
2004/0033478 A1   2/2004 Knowles et al.

FOREIGN PATENT DOCUMENTS

| GB | 2 337 669 A | 11/1999 |
| WO | WO 96/18982 | 6/1996 |
| WO | WO 00/42494 | 7/2000 |
| WO | WO 2004/017662 A2 | 2/2004 |

OTHER PUBLICATIONS

Commonly assigned U.S. Appl. No. 10/248,578, filed Jan. 30, 2003, entitled Wireless Response System With Feature Module.

Commonly assigned U.S. Appl. No. 10/248,588, filed Jan. 30, 2003, entitled Wireless Response System and Method.

Commonly assigned U.S. Appl. No. 10/248,583, filed Jan. 30, 2003, entitled Wireless Response System and Method.

* cited by examiner

WIRELESS POLLING SYSTEM USING SPREAD-SPECTRUM COMMUNICATION

CROSS REFERENCE TO RELATED APPLICATIONS

This application claims priority from U.S. Provisional patent application Ser. No. 60/469,697, filed on May 12, 2003, the disclosure of which is hereby incorporated herein by reference in its entirety.

BACKGROUND OF INVENTION

The present invention is directed to a wireless communication system using a spread-spectrum communication protocol and, in particular, to such a wireless communication system having a master unit sending polling signals to a plurality of slave units over the at least one wireless communication link to retrieve data from the slave units. The invention may be useful with a wireless response unit which retrieves response data being entered in response units by a user, in a remote data collection system useful to retrieve sensor data from remote sensors, as well as other applications in which data must be wirelessly retrieved at a master unit from a series of slave units.

Spread spectrum protocol is useful in wireless communications. By distributing wireless communication over a large bandwidth, a higher transmission power may be used within government regulations without requiring the payment of licensing fees. One form of spread spectrum is frequency hopping in which the spectrum is divided into a number of frequency channels. The transmission hops between the various channels with substantially equal transmission time in all of the channels being utilized. In order for the transmitter and receiver to operate at the same frequency, it is necessary to provide a technique for coordinating their hopping. This may be accomplished by providing pseudorandom frequency hop tables in the transmitting and receiving units to coordinate the hopping.

While known spread spectrum frequency hopping protocols are useful for certain applications, they have not been proposed for polling based systems, especially ones having a large number of slave units. When a unit is placed into operation, it must become synchronized with the polling sequence. In prior communication systems, such as cordless telephones, this may be accomplished by the receiving unit listening in on a particular channel until it receives a transmission and thereafter following the hopping of the transmitter unit with the assistance of the frequency-hopping table. However, in polling-based systems, the interval between transmissions from the master unit may be sufficiently long that an inordinate amount of time may pass before a transmission occurs on a particular channel.

SUMMARY OF INVENTION

The present invention provides a spread-spectrum frequency hopping protocol that is particularly useful with a wireless communication system having at least one master unit which sends polling signals to a plurality of slave units over at least one wireless communication link. The slave units send data to the at least one master unit over the wireless communication link in response to one of the polling signals.

According to an aspect of the invention, a wireless communication system and method includes providing at least one master unit and a plurality of slave units communicating with the at least one master unit over at least one wireless communication link. The at least one master unit sends polling signals to the slave units over the at least one wireless communication link. The slave units send data to the at least one master unit over at least one communication link in response to one of the polling signals. The communication link is made up of at least one master transceiver at the at least one master unit and a plurality of slave transceivers each at one of the slave units. The at least one master transceiver and the slave transceivers communicate with a spread-spectrum hopping protocol.

According to another aspect of the invention, the frequency hopping protocol includes a home frequency. The at least one master transceiver transmits an initial transmission at the home frequency and the slave transceivers attempt to receive the initial transmission at the home frequency. This allows the slave unit to be able to synchronize with the master unit polling by providing a common frequency for the slave unit to go to, such as when it is initially placed into service.

According to another aspect of the invention, the protocol includes a home frequency wherein the at least one master transceiver transmits an initial transmission at the home frequency and a master transmission at a hop frequency. The initial transmission at the home frequency transmits a designation of the hop frequency to the slave units. The master transmission transmits data to the slave units. The master transmission may be of a duration corresponding to one frequency hop.

The initial transmission may have a duration that is related to the duration of the master transmission in the manner that the initial transmissions for an entire cycle of frequency hops can equal one hop duration.

These and other objects, advantages and features of this invention will become apparent upon review of the following specification in conjunction with the drawings.

DETAILED DESCRIPTION OF THE PREFERRED EMBODIMENT

Figure 1:
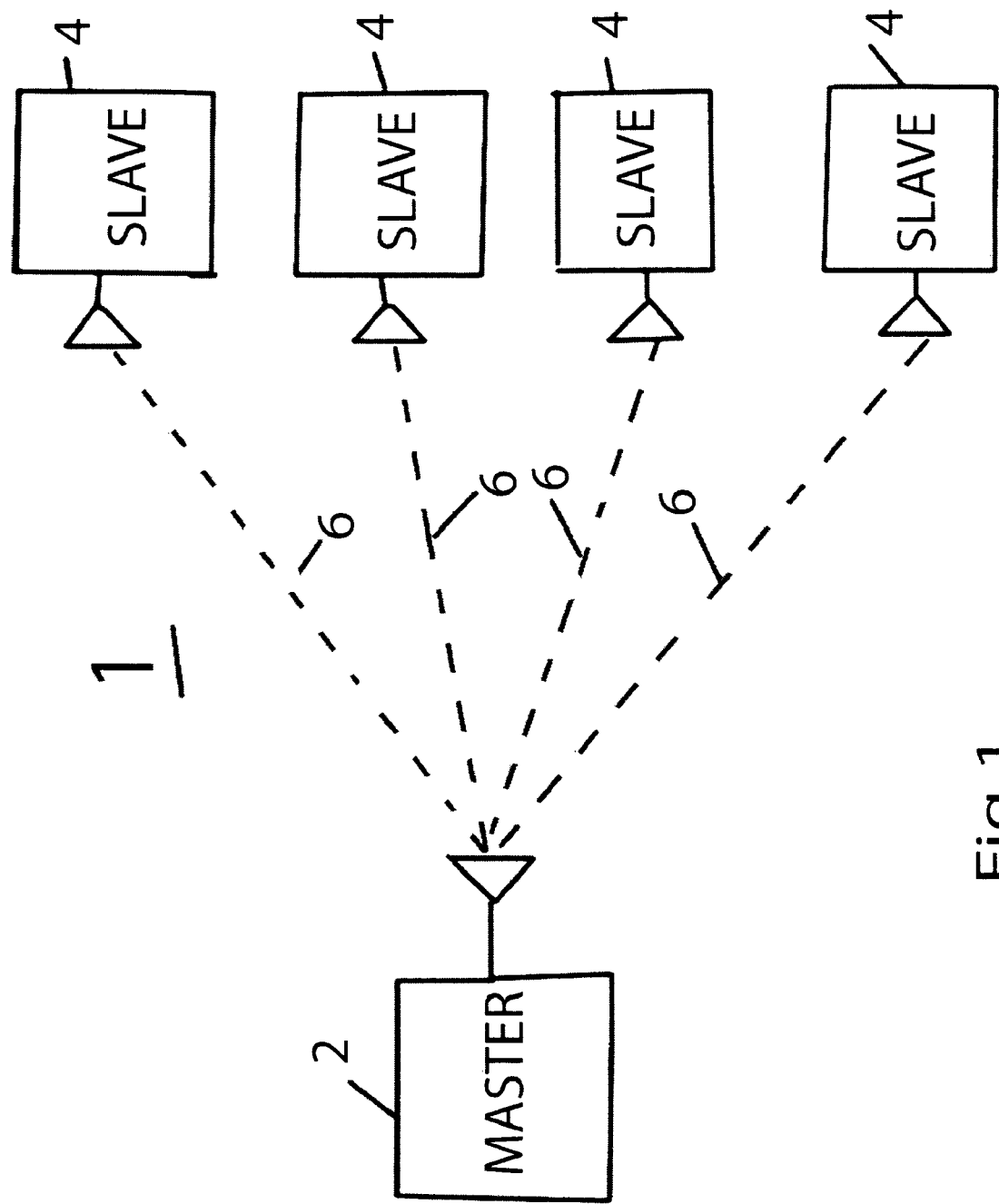
FIG. 1 is a block diagram of a wireless communication system, according to the invention.

Referring now specifically to the drawings, and the illustrative embodiments depicted therein, a wireless communication system 1 includes at least one master unit 2 and a plurality of slave units 4 which communicate with master unit 2 over at least one wireless communication link 6 (FIG. 1). The at least one master unit 2 sends polling signals to the slave units 4 over wireless communication link 6. Slave units 4 send data to master unit 2 over wireless communication link 6 in response to one of the polling signals. Master unit 2 and slave units 4 communicate with a spread-spectrum frequency hopping protocol, as will be described in more detail below.

Figure 2:
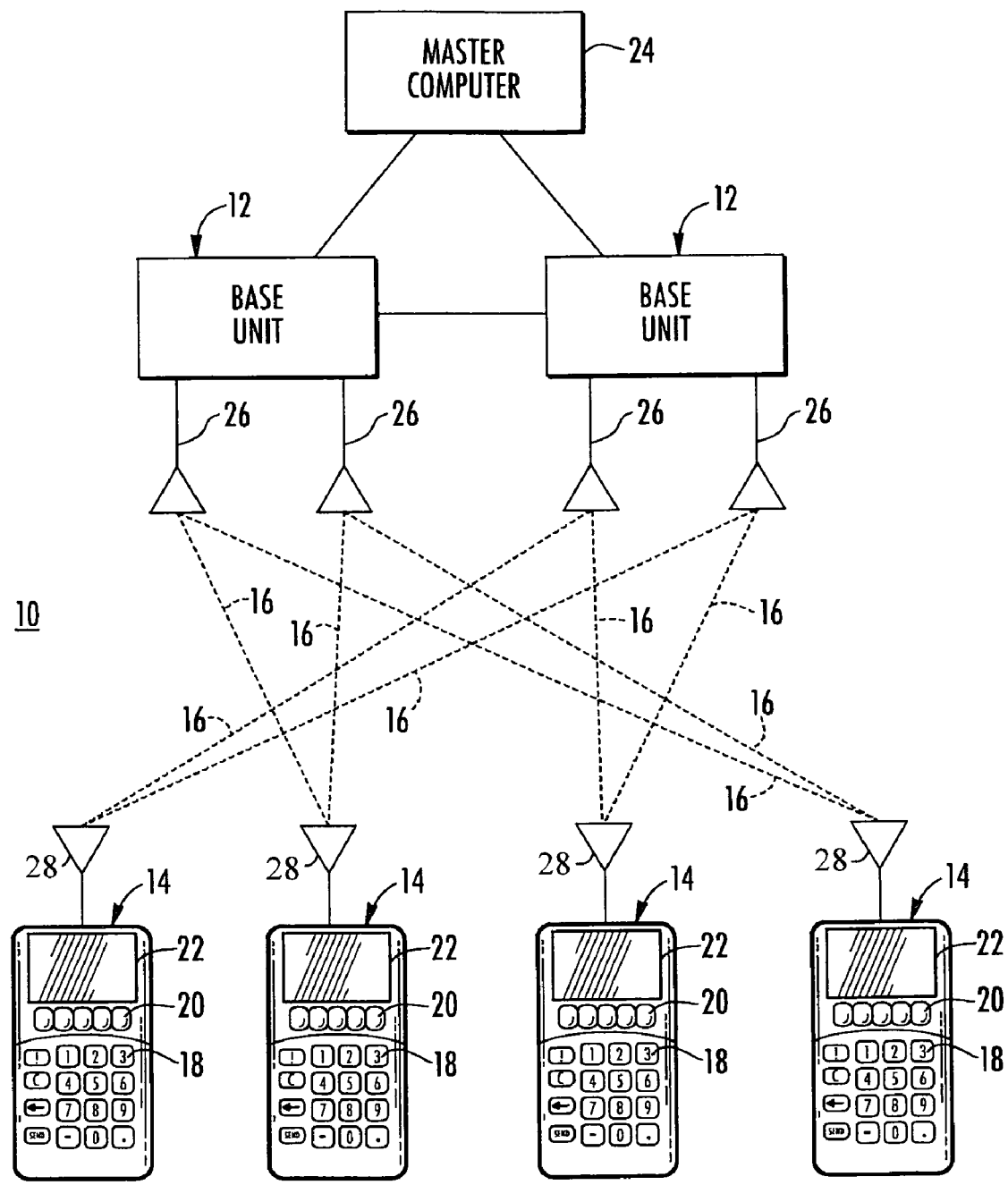
FIG. 2 is a block diagram of a wireless response system, according to the invention.

In an illustrative embodiment, wireless communication system 1 may be a wireless response system 10 (FIG. 2) of the type disclosed in commonly assigned patent application Publication Nos. 2003/0153347 A1; 2003/0153321 A1; and 2003/0153263 A1, the disclosures of which are hereby incorporated herein by reference. It should be understood that, although illustrated in detail with respect to a wireless response system, wireless communication system 1 may be embodied in other systems, such as a data retrieval system from a series of sensor units, retrieval of data from digital data recorders, or the like. Wireless response system 10 is disclosed in detail in the previously referred to patent applications and will not be described in detail herein. Suffice it to say, wireless response system 10 includes one or more base units 12 and a plurality of response units, or keypads, or handheld units 14, which communicates with the base unit(s) over one or more wireless communication links 16. The base unit(s) sends polling signals, over wireless communication link 16 and the response units send response data to the base unit over the wireless communication link(s) in response to the polling signals. The response data is entered in the respective response unit by a user. An illustration of the protocol of the communication between base unit 12 and the response unit may be generally as disclosed in detail in commonly assigned U.S. Pat. Nos. Re. 35,449 for a REMOTE TWO-WAY TRANSMISSION AUDIENCE POLLING AND RESPONSE SYSTEM; U.S. Pat. No. 5,724,357 for a REMOTE RESPONSE SYSTEM AND DATA TRANSFER PROTOCOL; and U.S. Pat. No. 6,021,119 for a MULTIPLE SITE INTERACTIVE RESPONSE SYSTEM, the disclosures of which are hereby incorporated herein by reference. Each response unit 14 may include user input devices, such as a keypad 18, a series of soft keys 20, or the like. Each response unit 14 may additionally include a display 22 for displaying information to the user, as well as indicating user selections. Base unit 12 may be connected with a command computer 24 in order to provide top level control of wireless response system 10, as well as to run software applications to analyze data produced by wireless response system 10.

In the illustrative embodiment, two base units 12 are illustrated, each with a pair of synchronized transceivers 26. However, it should be understood that for certain applications, only one base unit 12, or more than two base units 12, may be utilized and base unit 12 may utilize only one transceiver 26 or more than two transceivers 26. Each response unit 14 includes a transceiver 28 for wireless communication with base transceiver(s) 26 over wireless communication link(s) 16.

Figure 3:
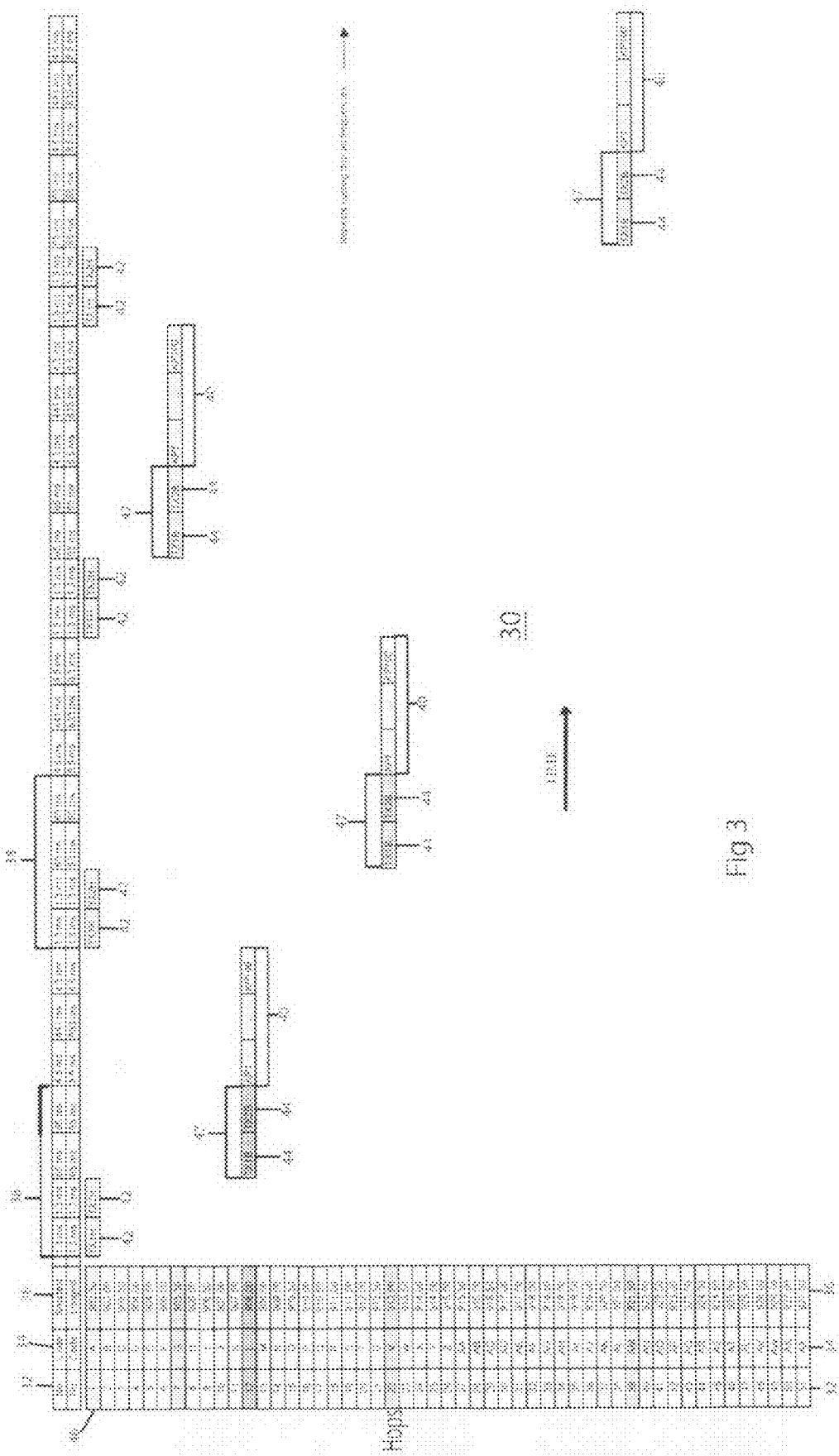
FIG. 3 is a frequency table of a spread-spectrum frequency hopping protocol, according to the invention.

In one illustrated embodiment, wireless communication system 1 and wireless response system 10 utilize a spread-spectrum frequency hopping protocol 30 illustrated in FIG. 3. Protocol 30 is made up of a plurality of distinct frequency channels, or hops, 32, which are referred to by a code letter 34. Each frequency hop, or channel, has a unique frequency band 36. Master unit 2 transmits a polling signal 38. In response to the polling signal 38, all of the slave transceivers 4 send data to master unit (2) during a data transfer period 40. Polling signal 38 is made up of an initial, or home, transmission 42 and a master transmission 44. Initial transmissions 42 are all at the same frequency band 36, which is designated a home frequency 46. Master transmission 44 and slave unit response 40 occur at a different frequency band for each sequence of polling signal and slave unit response. The master transmission and slave response units may occur at a common frequency band 36, as illustrated in FIG. 3, or may be divided up over two or more different frequency bands as will be discussed in more detail below. By this frequency hopping, a spread-spectrum protocol is carried out. In the embodiment illustrated in FIG. 3, duplicate initial transmissions 42 and duplicate master transmissions 44 are illustrated for each polling signal 38. This is accomplished with a master unit having two transceivers 26 which are synchronized in order to send polling signals 38 that are temporally separate from each other. In a like fashion, master transmissions 44 may be sent from plural master transceivers with temporal separation between the master transmissions. However, it should be understood that protocol 30 may be carried out with an individual master transceiver 26 sending an individual initial transmission and individual master transmissions.

Initial transmission 42, in the embodiment illustrated in FIG. 3, has a time duration of 1.3 ms, which is significantly shorter than the time duration illustrated at 65 ms of the master transmission 44. Master transmission 44 has a time duration of one frequency hop 47. Initial transmission 42 transmits a hop code 34 for the master transmission 44 and slave unit responses 40 that are to follow. This allows the initial transmission 42 to have a short duration. In the illustrative embodiment, master transmission 44 sends data to the slave units, such as described in U.S. Pat. No. 5,724,357 for a REMOTE RESPONSE SYSTEM AND DATA TRANSFER PROTOCOL, the disclosure of which is hereby incorporated herein by reference. Examples of data that could be sent with master transmission 44 include acknowledge data to acknowledge receipt of valid data transmissions from the slave units, software code to update the software run on the slave units, instructional messages to be displayed on displays 22, and the like. Slave units 4 transmit in a particular fashion during a slave unit response period 40. In the illustrative embodiment, the slave units respond in time domain multiplexing in the manner disclosed in the '357 patent. The slave units send data over wireless communication link(s) to the master unit(s). This data may include, by way of example, data entered by a user in keypad 18 and soft keys 20, data accumulated by a sensor at the slave unit, or the like. The data may be returned to the master unit over the same frequency band as used by the master transmission and as indicated by the frequency code sent in the corresponding initial transmission 42. Alternatively, the data may be returned to the master unit over one or more frequency bands that differ from that used by the master transmission.

In the embodiment illustrated in FIG. 3, each frequency hop has a duration made up of the duration of the polling signal 38 which is equal to one spread-spectrum cycle 48 divided by the number of frequency bands 36. In the illustrative embodiment, one frequency duration is approximately 132 ms for the polling signal. The initial transmissions 42, when combined over an entire spread-spectrum cycle, have a cumulative duration that is less than or equal to one frequency hop 47. Therefore, they satisfy the spread-spectrum protocol equivalent of one frequency hop 47. This allows the remaining frequency hops to be utilized for the master transmissions. It should be understood that spread spectrum rules apply to each transmitter. Therefore, the duty-cycle averaging of the initial transmission is with respect to only the length of the transmissions from the master unit. By utilizing a home frequency 46 for the initial transmission, each slave unit listens to that frequency for receipt of a hop frequency code at which master transmission 44 will be received. Thus, each slave unit is capable of receiving the next master transmission as soon as that slave unit is placed into service. This provides for a rapid synchronization of the slave unit to the master unit. Each slave unit transmission meets spread spectrum protocol because it is spread throughout the various hop frequencies.

Figure 5:
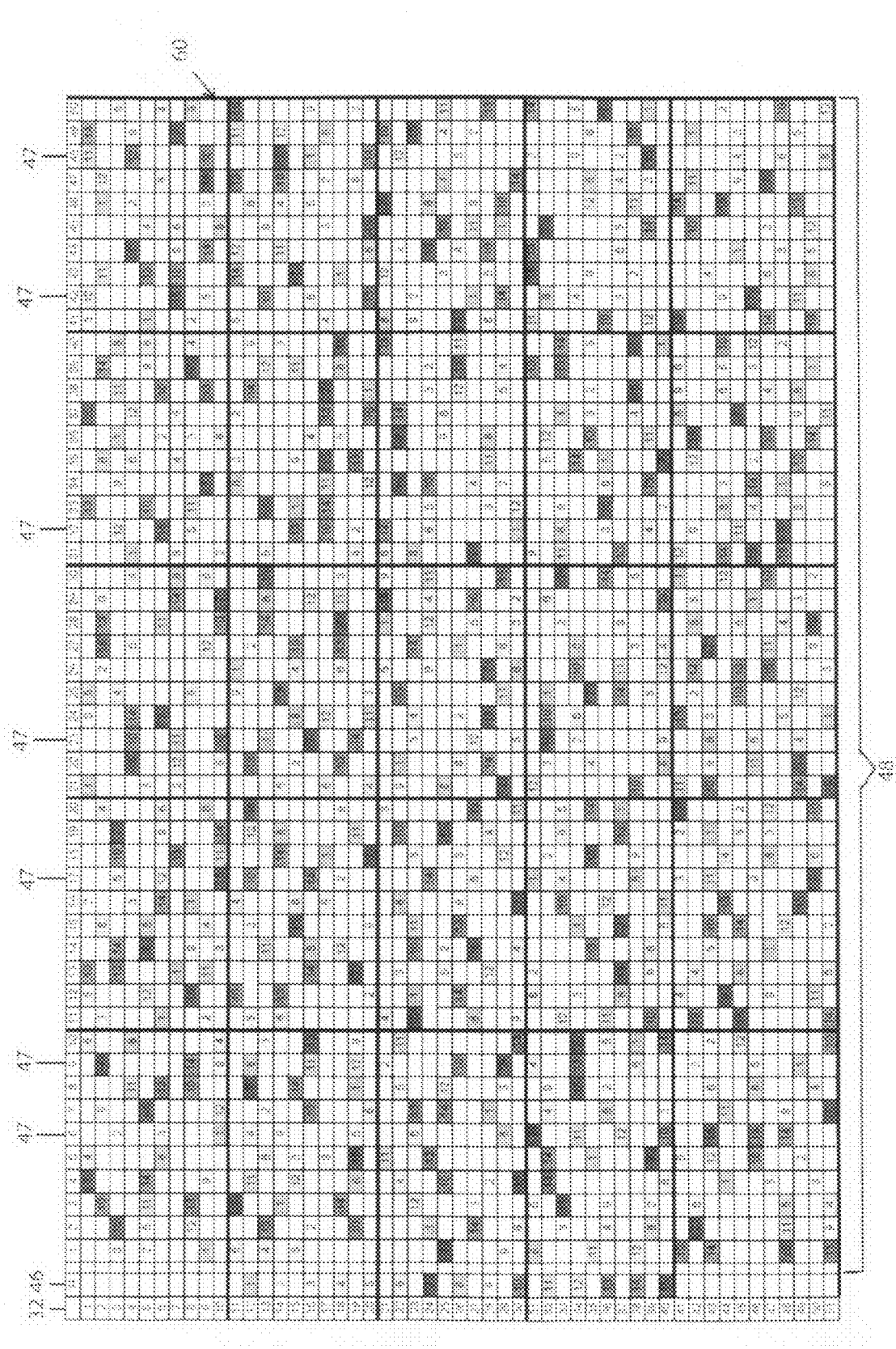
FIG. 5 is a frequency-hopping chart useful with the invention.
Figure 6:
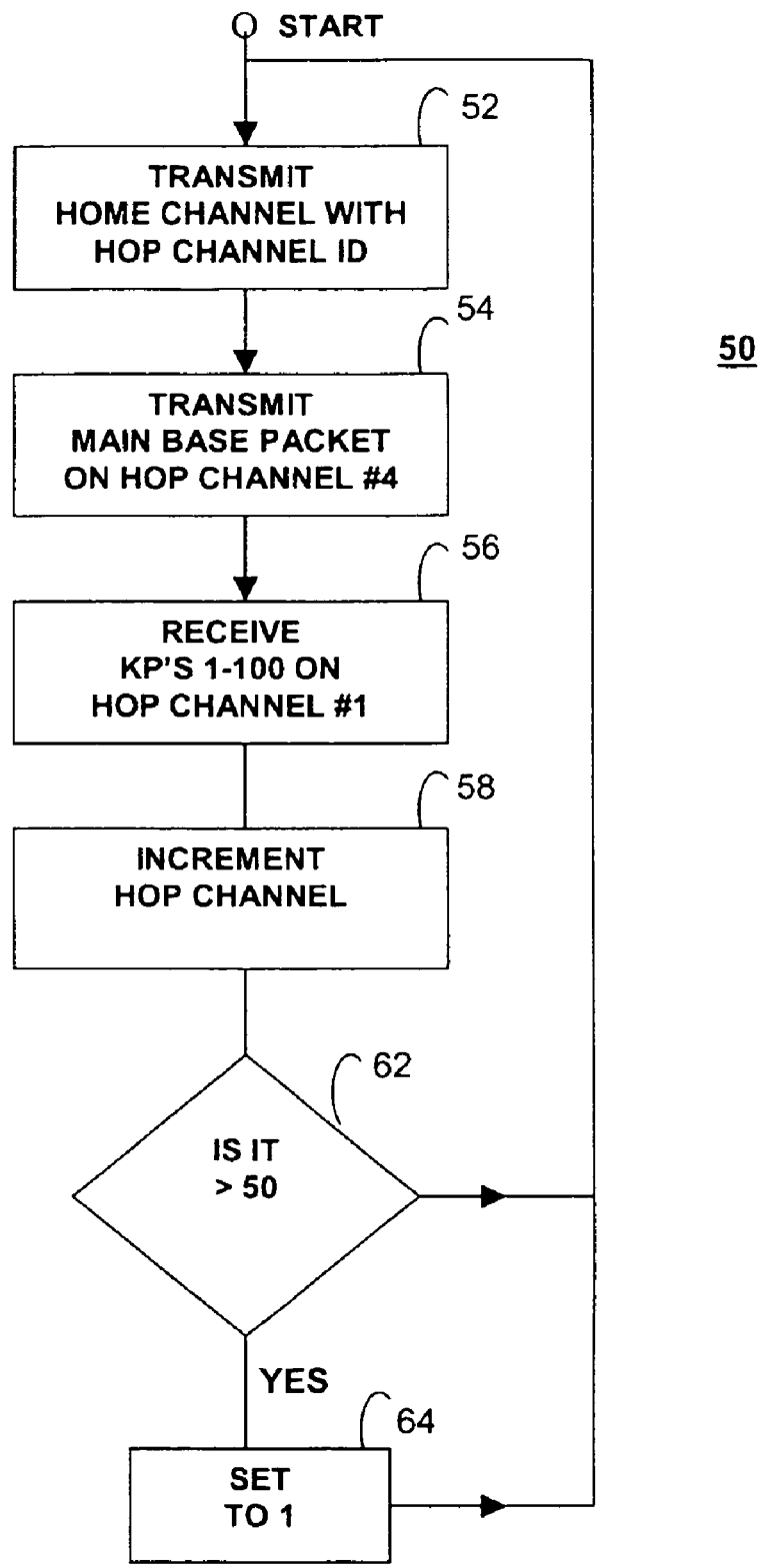
FIG. 6 is a flowchart of a master unit communication program.

Master unit 2 of the embodiment illustrated in FIG. 3 may include a master unit communication program 50 (FIG. 6). Program 50 begins at 52 by a transmission at the home channel of the initial transmission. The initial transmission contains a hop channel code 34. The master unit then transmits a master transmission, which, in the illustrative embodiment, is a base packet, at 54 at the hop channel ID designated at 52. The master unit then receives at 56 the slave unit responses on the hop channel designated at 52. At the end of the slave unit response period, program 50 increments the hop channel at 58 utilizing a frequency hop chart, such as hop chart 60 shown in FIG. 5. It is then determined at 62 whether the hop channel has been incremented to the last hop channel in the frequency duration. If so, the hop channel ID is incremented to 1 at 64. The master unit communication program then repeats itself beginning with a new initial transmission at the home channel (52).

Figure 7:
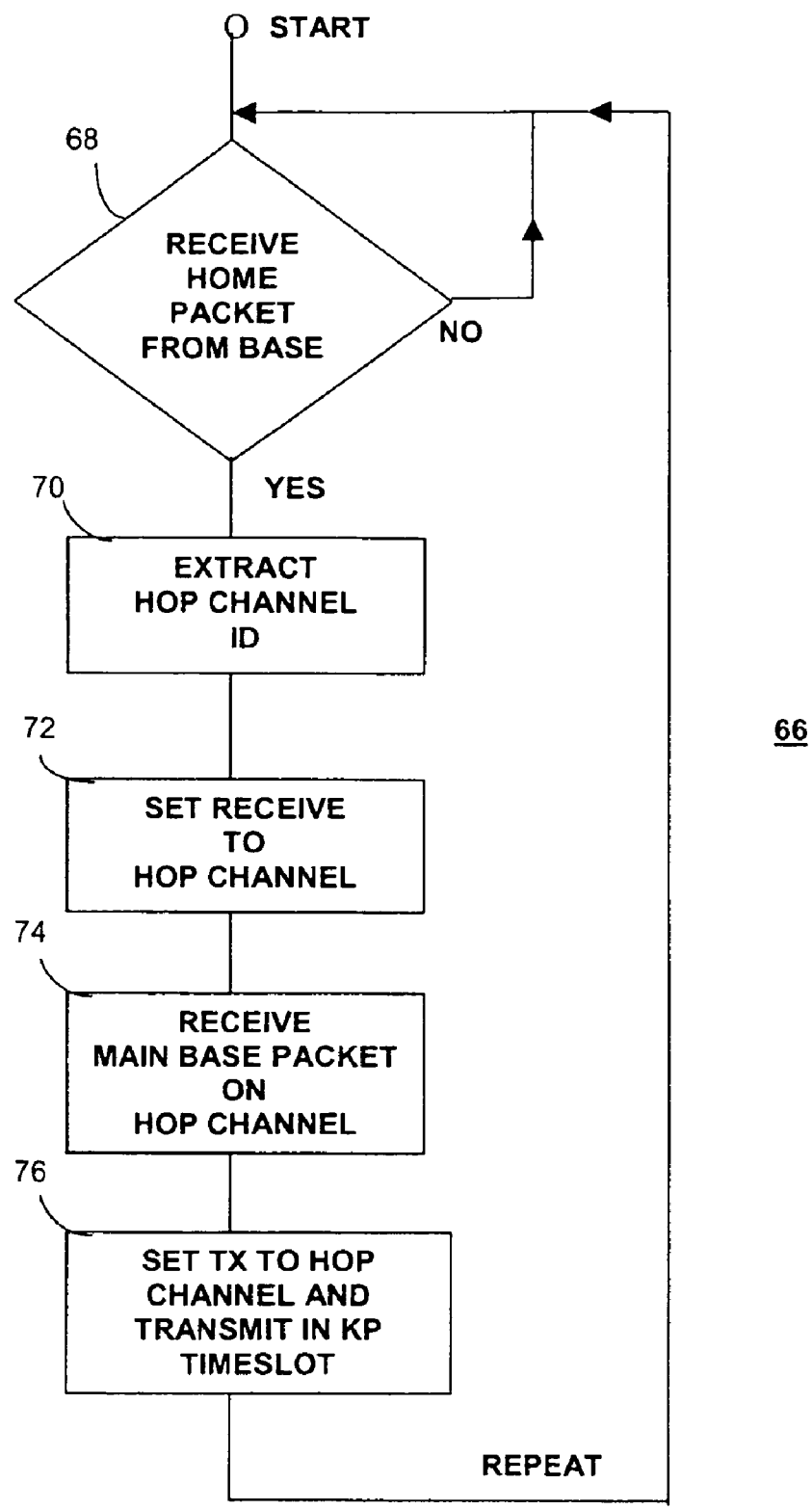
FIG. 7 is a flowchart of a slave unit communication program.

A slave unit communication program 66 (FIG. 7) for the embodiment illustrated in FIG. 3 begins by the slave unit tuning to, or listening to, the home frequency 46 for receipt of an initial transmission from the master unit a 68. When the initial transmission is received, the hop channel identification code is extracted at 70 and the receiver of the slave transceiver 28 is set to the hop channel at 72. The master transmission 44 is received at 74 on the hop channel. The transmitter portion of the slave transceiver is set to the hop channel at 76 and the slave unit response is transmitted to the master unit. The program then repeats.

Figure 8:
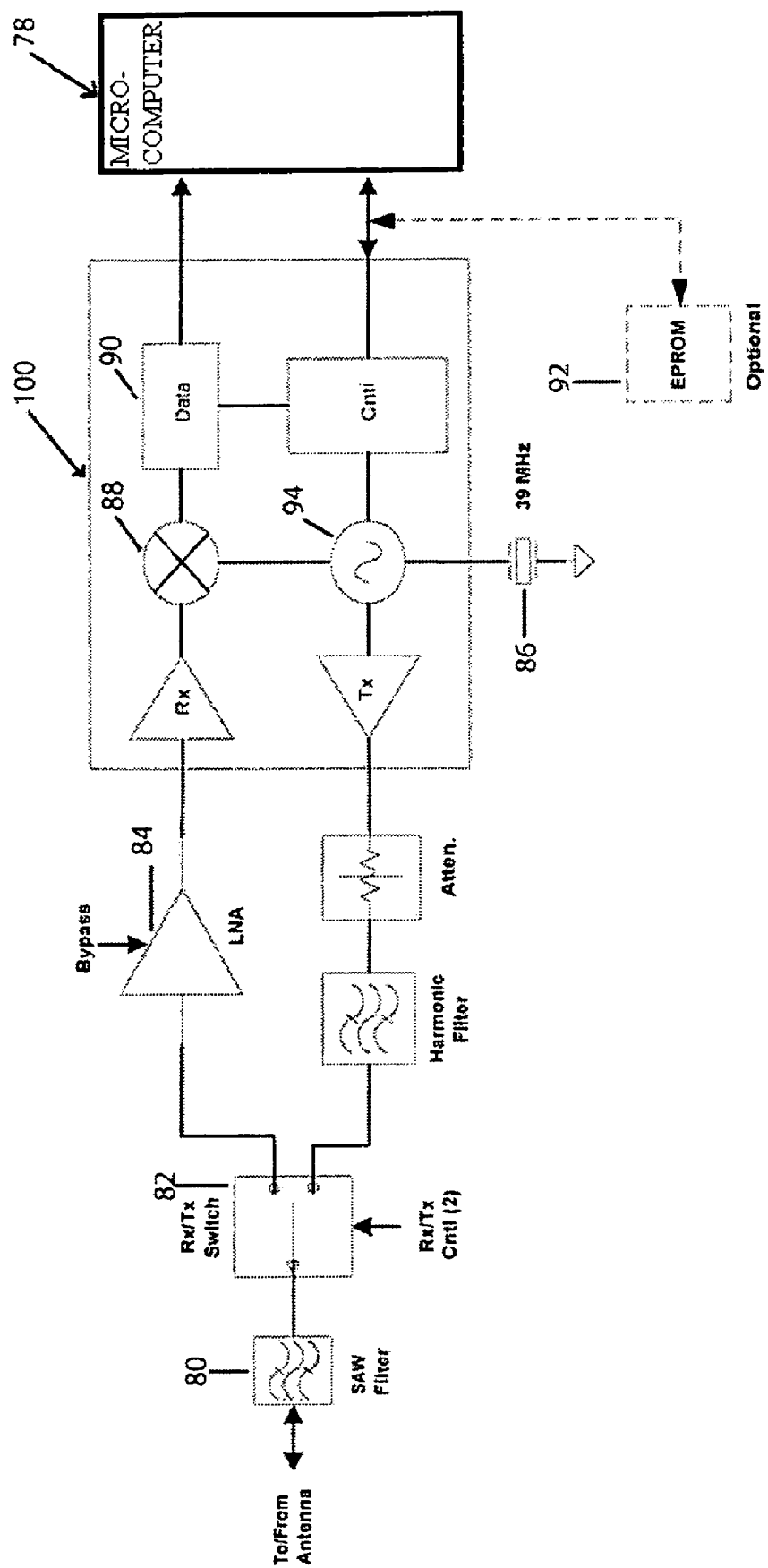
FIG. 8 is a block diagram of a transceiver that is useful with the invention.

Details of a transceiver useful as master transceiver 26 and slave transceiver 28 are illustrated in FIG. 8. Transceiver 26, 28 is a half duplex module that either transmits or receives wireless data. It is used in conjunction with a microcomputer 78, which runs slave unit communication program 66 or master unit communication program 50. Microcomputer 78 may perform other tasks as would be understood by those skilled in the art. Transceiver 26, 28 is capable of both receiving and transmitting. Although it is illustrated as a unitary module, it should be understood that transceiver 26, 28 could be implemented by separate transmitting and receiving modules.

The receiver portion of transceiver 26, 28 converts an incoming frequency shift key (FSK) modulated signal to a synchronized bit stream. The receiver has a SAW filter 80 to eliminate out-of-band interference and a receiver/transmit switch 82 to provide adequate isolation between the receiver and transmitter functions. A two-stage gain controllable amplifier 84 attempts to ensure linearity in the presence of strong RF signals. A radio-frequency local oscillator (RF LO) 86, that is the same as the RF carrier frequency, is combined to provide two in-phase and quadrature local oscillators for a quadrature down conversion mixer 88. Outputs from mixer 88 are applied to amplifiers and active low-pass filters before being input to limiter amplifiers. A bit synchronizer 90 transforms the data output to proper protocol for an input microcomputer 78.

The transmitter portion receives a data stream from microcomputer 78 and an optional EPROM memory 92 and includes a synthesizer 94, which performs FSK modulation of the RF carrier from the frequency synthesizer 86. A harmonic notch filter 96 and SAW band-pass filter 98 are for the purpose of maintaining harmonic and spurious signal levels within regulatory agency limits. In the illustrative embodiment, a portion of transceivers 26 and 28 are incorporated in a commercially available RF module 100 marketed by Semics under Module XE1202. However, the functions performed thereby may be supplied by standalone components or may be combined with other modules in order to carry out the functions performed by transceivers 26, 28. While the preceding description of the transceiver modules 26, 28 are for illustration purposes, it should be understood that the invention facilitates the use of conventional transceiver technology in combination with a microcomputer 78, programmed with program 50 or 66, to provide an inexpensive transceiver module capable of carrying out spread-spectrum protocol. This is in contrast to known chip-sets that provide for spread-spectrum communications, which are often costly custom developments.

Figure 4:
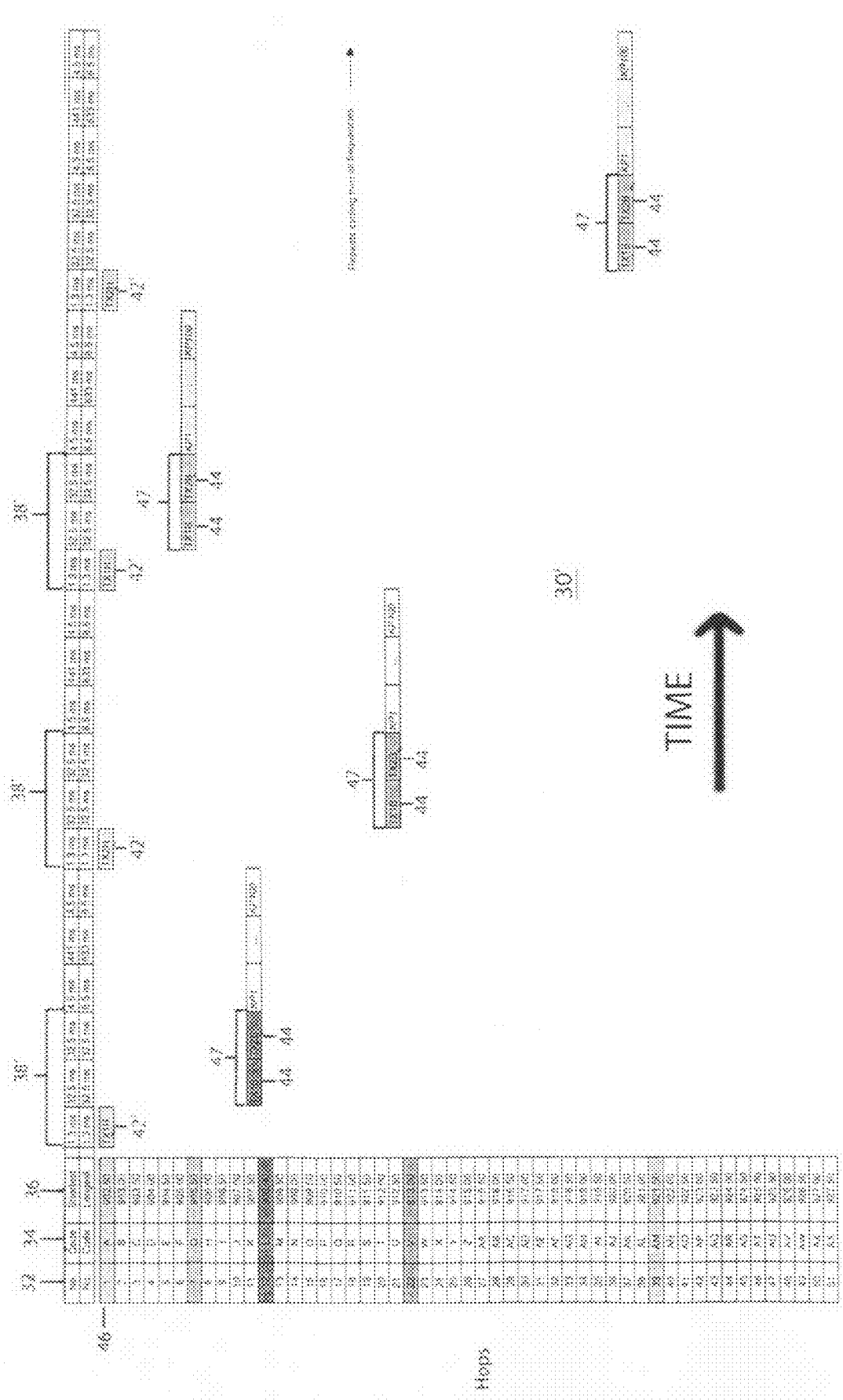
FIG. 4 is the same view as FIG. 3 of an alternative embodiment.

In an alternative embodiment illustrated in FIG. 4, a protocol 30' utilizes an initial transmission 42' transmitted by one of two transceivers 26 which operate on the same home frequency 46. The initial transmission includes the hop code for both transceivers 26 of the master unit which generate master transmissions 44 at the hop frequency. At the next frequency cycle 47, the other master transceiver 26 transmits an initial transmission 42' which is followed by the master transmissions 44 for both of the master transceivers 26. An advantage of the protocol 30' is that the initial transmission on the home frequency is limited to, in the illustrative embodiment, 1.3 ms rather than the combined 2.6 ms of the two initial transmissions 42 in FIG. 3. This allows the master transmission 42' for each transmitter to be limited to 32.5 ms, in the illustrative embodiment. This is the same proportion to the length of initial transmission 42' as the number of frequency hops. Thus, it is seen that protocol 30' facilitates a polling signal duration 38' which is approximately one-half the length of polling signal duration 38 in protocol 30 which is 65 ms. This is accomplished by having two transceivers, which are synchronized in order to send the polling signals temporally offset from each other with only one transceiver generating the initial transmission for a particular frequency hop. Although this may diminish somewhat the reliability of the system, because only one of the redundant transceivers are transmitting the initial transmission, the initial transmission includes minimal data and, therefore, is more likely to be validly received by all of the slave units.

Systems 1, 10 can be implemented utilizing multiple master transceivers operating on separate channels. An example of such system is disclosed in commonly assigned patent application Publication Nos. 2003/0153347 A1 entitled WIRELESS RESPONSE SYSTEM WITH FEATURE MODULE, 2003/0153321 A1 and 2003/0153263 A1, both entitled WIRELESS RESPONSE SYSTEM AND METHOD, the disclosures of which are hereby incorporated herein by reference. An advantage of utilizing multiple master transceivers operating at separate channels is that the number of slave units may be increased proportionately.

Frequency hop chart 60 for such a system having multiple transceivers is shown having multiple home frequencies 46, each of which is at a different hop frequency 32 (FIG. 5). Each of the home frequencies 46 designated 1-15 are utilized for one of the master transceivers 26, or pair of master transceivers 26. Thus, a group of slave transceivers, which communicates with a particular master transceiver(s), listens for the initial transmission 42 at the particular home frequency for that master transceiver(s). A different set of slave transceivers listens to the home frequency for the master transceiver(s) for that particular set of slave transceivers. The hop frequencies are arranged in frequency hop chart 60 in order to comply with a pseudo-random arrangement required by the regulatory authorities. Also, under normal operating conditions, no two transceivers should be transmitting at the same time on the same frequency.

Thus, it is seen that the invention is embodied in a base unit that is the master of the system and response units that operate as slaves. The base unit acting as a master unit seeds the hop sequence for both itself and all slave units. The hop sequence it follows is contained in firmware in the base unit. Patterns for the pseudo-random hop sequences are illustrated in the chart in FIG. 5.

The base unit serves as the master by using 51 frequencies. One of the 51 frequencies is assigned as the home frequency. All slave units, when turned on, start receiving transmissions on their home frequency. A very short transmission on this frequency provides a data packet to the slave units which communicates the identity of what hop frequency will next be used for the main base packet and for the keypad return transmission. The equal transmissions on all frequencies are provided by the fact that the home transmissions are very short in duration such that the sum of them for each base transmitter is equal to the duration of each hop on the other frequencies. In the chart in FIG. 4, this is shown to be 25 times 1.3 ms or a total of 32.5 ms for the first transmitter on the home frequency where each of the 50 other channels is 32.5 ms. Each of the transmitters in the base (two used for the diversity/coverage benefits) spends 32.5 ms on each of the 51 frequencies 32.5 ms on the home frequency and 32.5 ms on each of the 50 other hops. Thus, the transmissions are spread uniformly across the band and are of equal duration over time. The chart in FIG. 5 shows typical combinations of home and pseudo-random hops used by the base to guarantee that all frequencies are used equally over time.

The slave units employ spread spectrum hopping as follows. When activated, a unit goes into a receive mode on the home frequency to look for an initial transmission. When a valid initial transmission is received, the receiver then hops to the frequency designated in the initial transmission. It receives the master transmission with its contents on that channel. It then goes into a time division multiplexing mode where it waits for the occurrence of its assigned timeslot based on slave unit address (each timeslot has an assigned address) to activate its transmitter and return its data to the base on this same hop frequency. So, the slave unit always transmits back to the base on a frequency derived from information contained in the last received initial transmission. Since the base rotates through the 50 hop frequencies before repeating, all 50 frequencies are used equally.

Figure 9:
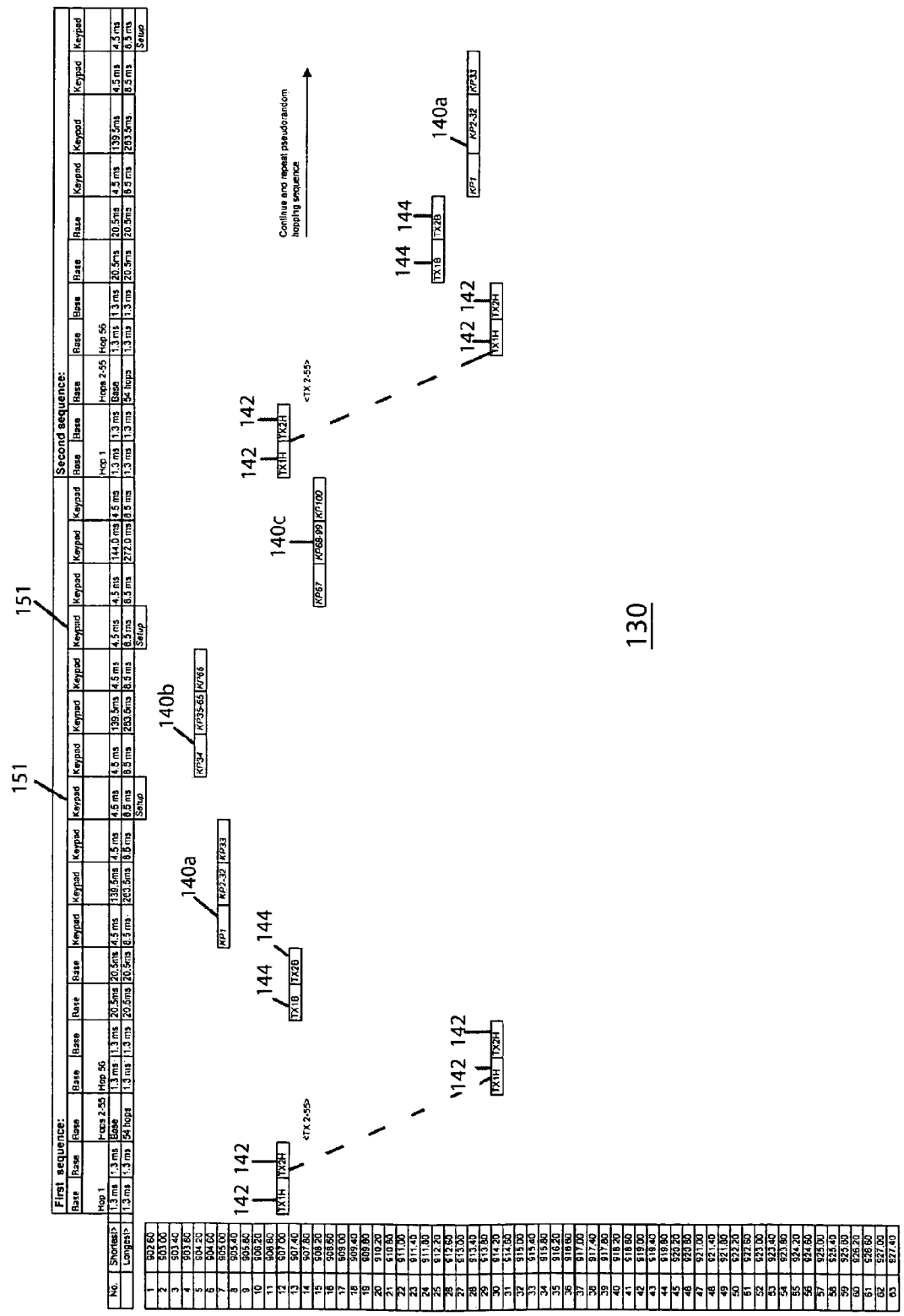
FIG. 9 is the same view as FIG. 3 of another alternative embodiment.

In an additional alternative embodiment, a spread-spectrum protocol 130 is provided (FIG. 9). In protocol 130, the base unit sends out a series of home transmissions 142 on different hop frequencies. In the illustrative embodiment, the base unit transmits on each of the hop frequencies according to the pseudo-random chart 60. Each of the transmitters in the base unit spread their transmissions uniformly across the band and spend a substantially equal amount of time on each hop frequency. This complies with the requirement that equity be maintained among the hop frequencies as represented by the pseudo-random chart. When a group of response units, such as units KP1-KP100, receive a home transmission at their respective home frequencies, information is provided to the response units to listen to the master transmission 144 at that frequency. Master transmission 144 is repeated by each of the base unit transceivers and is similar to master transmission 44. However, the base transmission includes a seed packet that is used by the response units to calculate a response frequency. From this seed packet, each response unit receives a subset of the pseudo-random hop table. Based on the address of the response unit and this table, a response unit calculates what hop frequency it will use when it needs to transmit. In the illustrative embodiment, the response units KP1-KP100 are seeded to respond in three distinct hop frequencies. Keypads KP1-KP33 respond at hop frequency 140a, response units KP34-KP66 respond at hop frequency 140b, and response units KP67-KP100 respond at hop frequency 140c. Hop frequencies 140a and 140b are separated by a setup interval 151, and interval 140b is separated from 140c by a setup interval 151. Setup intervals 151 provide a brief interval for the units to shift in frequency.

After the response units respond during intervals 140a, 140b and 140c, the base unit again transmits home transmissions 142 on all hop frequencies according to the pseudo-random chart. The group of keypads will respond when their respective home frequency is transmitted by listening to the hop frequency contained in that transmission. The base unit transceivers will transmit at that hop frequency sending the seed to the response units who will, as previously described, respond at hop frequencies during intervals 140a, 140b and 140c (only interval 140a is shown in FIG. 9). In this manner, the response units work their way through the pseudo-random hop frequency chart utilizing a set of pointers. Concurrently, the base unit works its way through the hop frequency chart using its own set of pointers. However, in all cases, the information used to work through the pseudo-random chart is provided from the base unit to the response units.

Referring back to FIG. 5, it can be seen that the ability to provide multiple home frequencies, 15 of which are illustrated in FIG. 5, allows an equal number of different systems to be operating in the same space without interfering with each other. This is accomplished by each system having a separate home frequency, which is separate from the home frequencies of the other systems. In the illustrative embodiment, the home transmission 42 may include an identifier on the channel transmitting that frequency as described in detail in commonly assigned patent application Publication No. 2003/0236891 A1, by Glass et al. for a WIRELESS ASYNCHRONOUS RESPONSE SYSTEM, the disclosure of which is hereby incorporated herein by reference. This channel identifier ensures that the response unit has received the correct home frequency transmission. In the case of 15 separate systems, all 15 base units cycle through the initial transmission codes in a pseudo-random fashion in a manner which does not conflict with each other.

In the case of the response units, they are repeatedly transmitting on different frequencies. Therefore, should a transmission at a particular frequency be inadequately received by the base unit, the response unit will continue to repeat transmission of its data packet in the fashion described in the '357 patent previously set forth. It may be desirable to have a further enhancement to allow the base unit to also transmit on different home frequencies, thereby increasing the likelihood that a transmission will be received by the response unit. In the embodiment illustrated in FIGS. 5 and 9, this further enhancement may be provided by providing the ability of response units to respond to other initial transmissions than their defined home frequency. For example, should a keypad not be able to receive an initial transmission 142 within a predetermined time period, it could be programmed to listen for a different home frequency on a different channel. Because of the unique identifiers that are contained within the home transmissions, the unit could synchronize with a different home frequency. This advantageously provides the ability of a system to be more robust because it further reduces the likelihood that a response unit may not receive the initial transmission from the base unit.

The communication system disclosed herein is capable of increased transmission power while still complying with regulatory requirements. This is especially useful with the transmitter of the master unit. This allows greater range between the master unit and slave units while increasing reliability of signal reception.

Moreover, the communication system allows the response units to quickly become synchronized with the transmissions of the base unit. This is accomplished by a series of short initial transmissions at a home frequency which gets the response units into sync. This is followed by a longer transmission from the base unit that carries the payload. This eliminates the need for multiple long transmissions before the units are synchronized.

While the embodiments described above relate to a wireless communication system implemented with a frequency hopping spread spectrum protocol, it will be appreciated that the invention can be implemented with other variations of spread spectrum protocol including frequency hopping. For example, the invention could be implemented with a hybrid combination of direct sequence and frequency hopping protocol.

Changes and modifications in the specifically described embodiments can be carried out without departing from the principles of the invention which is intended to be limited only by the scope of the appended claims, as interpreted according to the principles of patent law including the doctrine of equivalents.

The invention claimed is:

1. A wireless communication system, comprising:
at least one base unit and a plurality of handheld response units communicating with said at least one base unit over at least one wireless communication link, said at least one base unit comprising a base processor and at least one base transceiver, said plurality of handheld response units comprising a plurality of response processors and a plurality of response transceivers, each of said response processors and response transceivers at one of said response units, said at least one wireless communication link comprising said at least one base transceiver and said plurality of response transceivers;
wherein said base processor is programmed to control said at least one base transceiver to send polling signals to said response units over said at least one wireless communication link;
wherein said response processors are programmed to control said response transceivers to send response data to said at least one base unit over said at least one wireless communication link in response to one of the polling signals, the response data being entered in the respective response unit by a user; and
wherein said at least one base transceiver is controlled by said base processor and said response transceivers are controlled by said response processors to communicate with a spread-spectrum frequency hopping protocol, wherein said at least one base transceiver sends polling signals and said response transceivers send data in response to the polling signals using time domain multiplexing;
wherein said at least one base unit provides frequency hopping information to said response units so that said response units can respond to the polling signals, wherein said polling signals include an initial transmission having a seed packet and wherein said response units receive said polling signals and determine a hop frequency to send a response to that particular polling signal as a function of the information contained in the seed packet and as a function of an address assigned to the response unit, wherein at least some of said response units send a response to a particular polling signal at different hop frequencies.

2. The system of claim 1 wherein said at least one base transceiver comprising a plurality of base transceivers at said at least one base unit, said base transceivers sending polling signals having a particular temporal relationship with each other.

3. The system of claim 2 wherein at least some of said base transceivers transmit on common hop frequencies.

4. The system of claim 1 wherein said at least one base transceiver comprising a plurality of base transceivers at said at least one base unit, wherein said plurality of base transceivers transmit on separate hop frequencies.

5. The system of claim 4 wherein said at least one base unit comprises a plurality of base units, each of said base transceivers at one of said base units.

6. The system of claim 4 wherein said plurality of base units operate from a common frequency hop table.

7. The system of claim 1 wherein said base processor comprises a base microcomputer and wherein said response processors comprise a plurality of response microcomputers.

8. The system of claim 7 including a frequency hop table at said at least one base unit.

9. The system of claim 8 wherein said response units communicate with said at least one base transceiver without direct access to a said frequency hop table.

10. The system of claim 1 wherein said polling signals further include a base transmission at a particular hop frequency, and wherein said slave units use the information contained in the seed packet to determine the hop frequency of the base transmission.

11. The system of claim 10 wherein the base transmission sends application data to the response units.

12. The system of claim 10 wherein said at least one base transceiver comprising a plurality of base transceivers at said at least one base unit, said base transceivers sending polling signals having a particular temporal relationship with each other.

13. The system of claim 12 wherein one of said plurality of base transceivers transmits said initial transmission and said plurality of base transceivers transmit the base transmission at the determined hop frequency.

14. The system of claim 13 wherein the frequency hopping protocol comprises a particular number of different frequency hops and wherein the initial transmission has a duration that is related to a duration of the base transmission as a function of the number of different frequency hops.

15. The system of claim 10 wherein said base transceivers transmitting on a common channel.

16. The system of claim 10 wherein said plurality of response transceivers transmit at one or more hop frequencies.

17. The system of claim 1 wherein the polling signals further include a base transmission, wherein the base transmission sends application data to the response units.

18. A wireless communication system, comprising:
at least one master unit and a plurality of slave units communicating with said at least one master unit over at least one wireless communication link, said at least one master unit comprising a master processor and at least one master transceiver, said plurality of handheld slave units comprising a plurality of slave processors and a plurality of slave transceivers, each of said slave processors and slave transceivers at one of said slave units, said at least one wireless communication link comprising said at least one master transceiver and said plurality of slave transceivers;

wherein said master processor is programmed to control said at least one master transceiver to send polling signals to said slave units over said at least one wireless communication link;

wherein said slave processors are programmed to control said slave transceivers to send data to said at least one master unit over said at least one wireless communication link in response to one of the polling signals;

wherein said at least one master transceiver is controlled by said base processor and said slave transceivers are controlled by said slave processors to communicate with a spread-spectrum frequency hopping protocol, wherein said at least one master transceiver sends polling signals and said slave transceivers send data in response to the polling signals using time domain multiplexing;

wherein said at least one master unit provides frequency hopping information to said slave units so that said slave units can respond to the polling signals, wherein said polling signals include an initial transmission having a seed packet and wherein said slave units receive said polling signals and determine a hop frequency to send a response to that particular polling signal as a function of the information contained in the seed packet and as a function of an address assigned to the slave unit, wherein at least some of said slave units send a response to a particular polling signal at different hop frequencies;

wherein the initial transmissions comprise transmissions on multiple different hop frequencies according to a spread-spectrum protocol; and wherein said slave transceivers receive an initial transmission at a particular home frequency.

19. The system of claim 18 wherein said at least one master transceiver comprising a plurality of master transceivers at said at least one master unit, said master transceivers sending polling signals having a particular temporal relationship with each other.

20. The system of claim 19 wherein said master transceivers transmit on common hop frequencies.

21. The system of claim 18 wherein said at least one master transceiver comprising a plurality of master transceivers at said at least one master unit, wherein said plurality of master transceivers transmit on separate hop frequencies.

22. The system of claim 21 wherein said at least one master unit comprises a plurality of master units, each of said master transceivers at one of said master units.

23. The system of claim 21 wherein said plurality of master units operate from a common frequency hop table.

24. The system of claim 18 wherein said slave units comprise user response units and wherein said response units send response data to said at least one master unit over said at least one wireless communication link in response to one of the polling signals, the response data being entered in the respective response unit by a user.

25. The system of claim 18 wherein the polling signals further include a master transmission at a particular hop frequency, wherein the master transmission sends application data to said slave units.

26. The system of claim 25 wherein the frequency hopping protocol comprises a particular number of different frequency hops and wherein the initial transmission has a duration that is related to a duration of the master transmission as a function of the number of different frequency hops.

27. The system of claim 25 wherein said slave units use the information contained in the seed packet to determine the particular hop frequency of the master transmission.

28. The system of claim 18 wherein said slave units send data to said at least one master unit over said at least one wireless communication link at one or more hop frequencies.

29. A wireless communication system, comprising:

at least one master unit and a plurality of slave units communicating with said at least one master unit over at least one wireless communication link, said at least one master unit comprising a master processor and at least one master transceiver, said plurality of handheld slave units comprising a plurality of slave processors and a plurality of slave transceivers, each of said slave processors and slave transceivers at one of said slave units, said at least one wireless communication link comprising said at least one master transceiver and said plurality of slave transceivers;

wherein said master processor is programmed to control said at least one master transceiver to send polling signals to said slave units over said at least one wireless communication link;

wherein said slave processors are programmed to control said slave transceivers to send data to said at least one master unit over said at least one wireless communication link in response to one of the polling signals; and wherein said at least one master transceiver is controlled by said master processor and said slave transceivers are controlled by said slave processors to communicate with a spread-spectrum frequency hopping protocol, wherein said at least one master transceiver sends polling signals and said slave transceivers send data in response to the polling signals using time domain multiplexing;

wherein said at least one master unit provides frequency hopping information to said slave units so that said slave units can respond to the polling signals, wherein said polling signals include an initial transmission having a seed packet and wherein said slave units are adapted to receive said polling signals and determine a hop frequency to send a response to that particular polling signal as a function of the information contained in the seed packet and as a function of an address assigned to the slave unit, wherein at least some of said slave units send a response to a particular polling signal at different hop frequencies;

wherein the initial transmissions comprise transmissions on multiple different hop frequencies according to a spread-spectrum protocol;

wherein said slave transceivers receive an initial transmission at a particular home frequency; and wherein each of said slave units dynamically moves to a different particular home frequency if no polling signal is received within a period of time.

30. The system of claim 29 wherein said at least one master transceiver comprising a plurality of master transceivers at said at least one master unit, said master transceivers sending polling signals having a particular temporal relationship with each other.

31. The system of claim 30 wherein said master transceivers transmitting at common hop frequencies.

32. The system of claim 31 wherein one of said plurality of master transceivers sends the initial transmission having the seed packet to said slave units.

33. The system of claim 32 wherein said plurality of master transceivers alternate sending the initial transmission.

34. The system of claim 29 wherein said at least one master transceiver comprising a plurality of master transceivers at said at least one base unit, said plurality of master transceivers transmitting at different hop frequencies.

35. The system of claim 34 wherein said at least one master unit comprises a plurality of master units, each of said master transceivers at one of said master units.

36. The system of claim 29 wherein said slave units comprise user response units and wherein said response units send response data to said at least one master unit over said at least one wireless communication link in response to one of the polling signals, the response data being entered in the respective response unit by a user.

37. The system of claim 29 wherein said slave units send data to said at least one master unit over said at least one wireless communication link at one or more hop frequencies.

38. The system of claim 29 wherein the polling signals further include a master transmission at a particular hop frequency, wherein the master transmission sends application data to said slave units.

39. The system of claim 38 wherein said slave units use the information contained in the seed packet to determine the particular hop frequency of the master transmission.

40. The system of claim 38 wherein the frequency hopping protocol comprises a particular number of different frequency hops and wherein the initial transmission has a duration that is related to a duration of the master transmission as a function of the number of different frequency hops.

41. The system of claim 18 wherein said master processor comprises a master microcomputer and said slave processors comprise a plurality of slave microcomputers.

42. The system of claim 29 wherein said master processor comprises a master microcomputer and said slave processors comprise a plurality of slave microcomputers.

* * * * *